Figure 5:
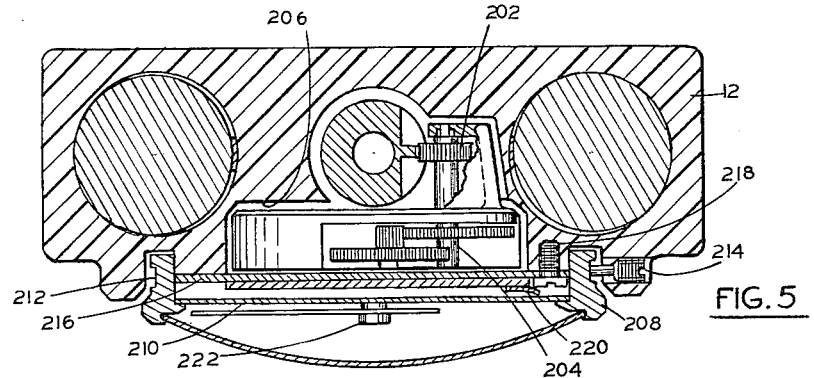

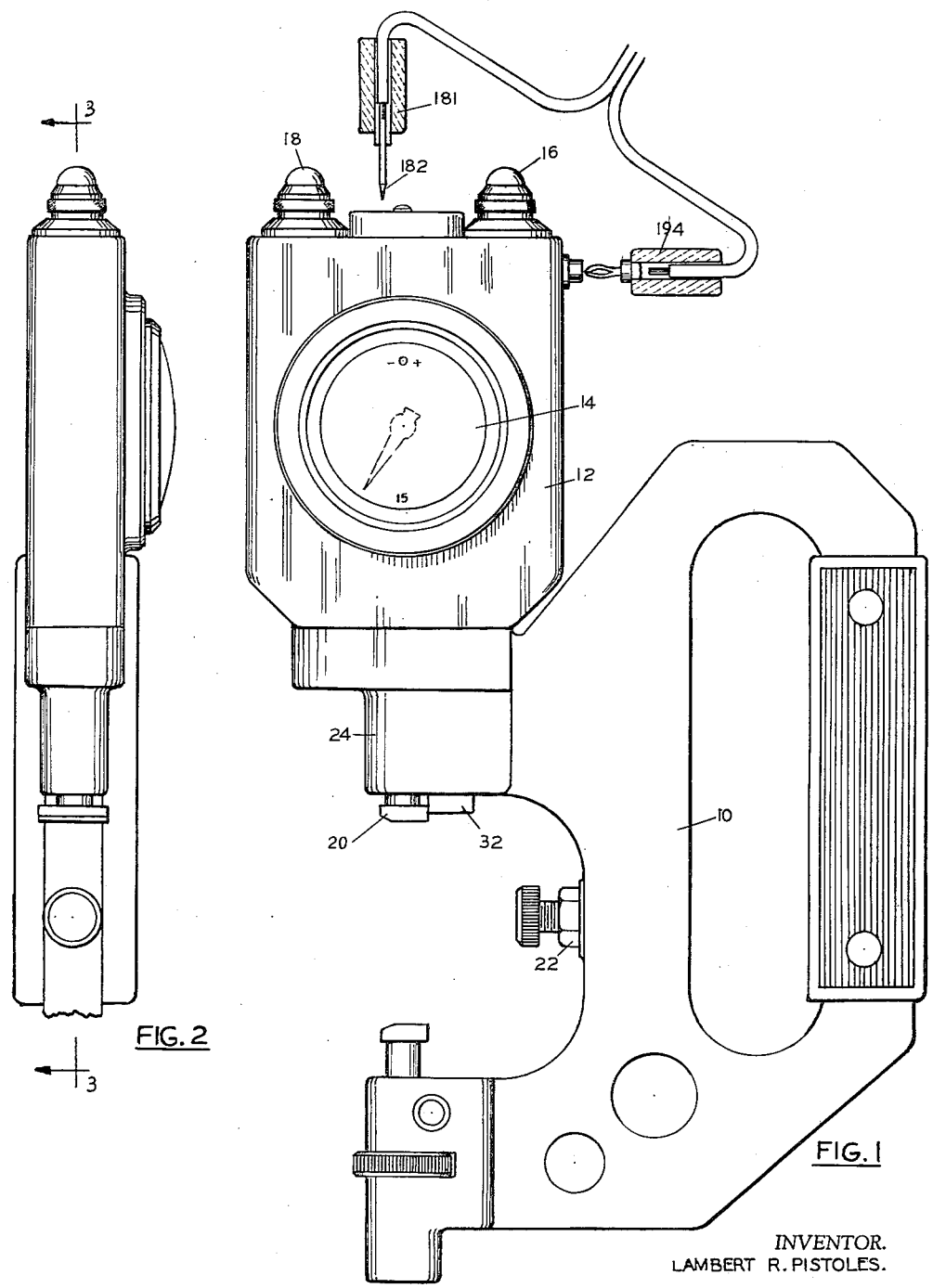

July 3, 1962   L. R. PISTOLES   3,042,909
GAGE HAVING BOTH DIAL AND ELECTRICAL INDICATORS
Filed Sept. 11, 1959   3 Sheets-Sheet 2
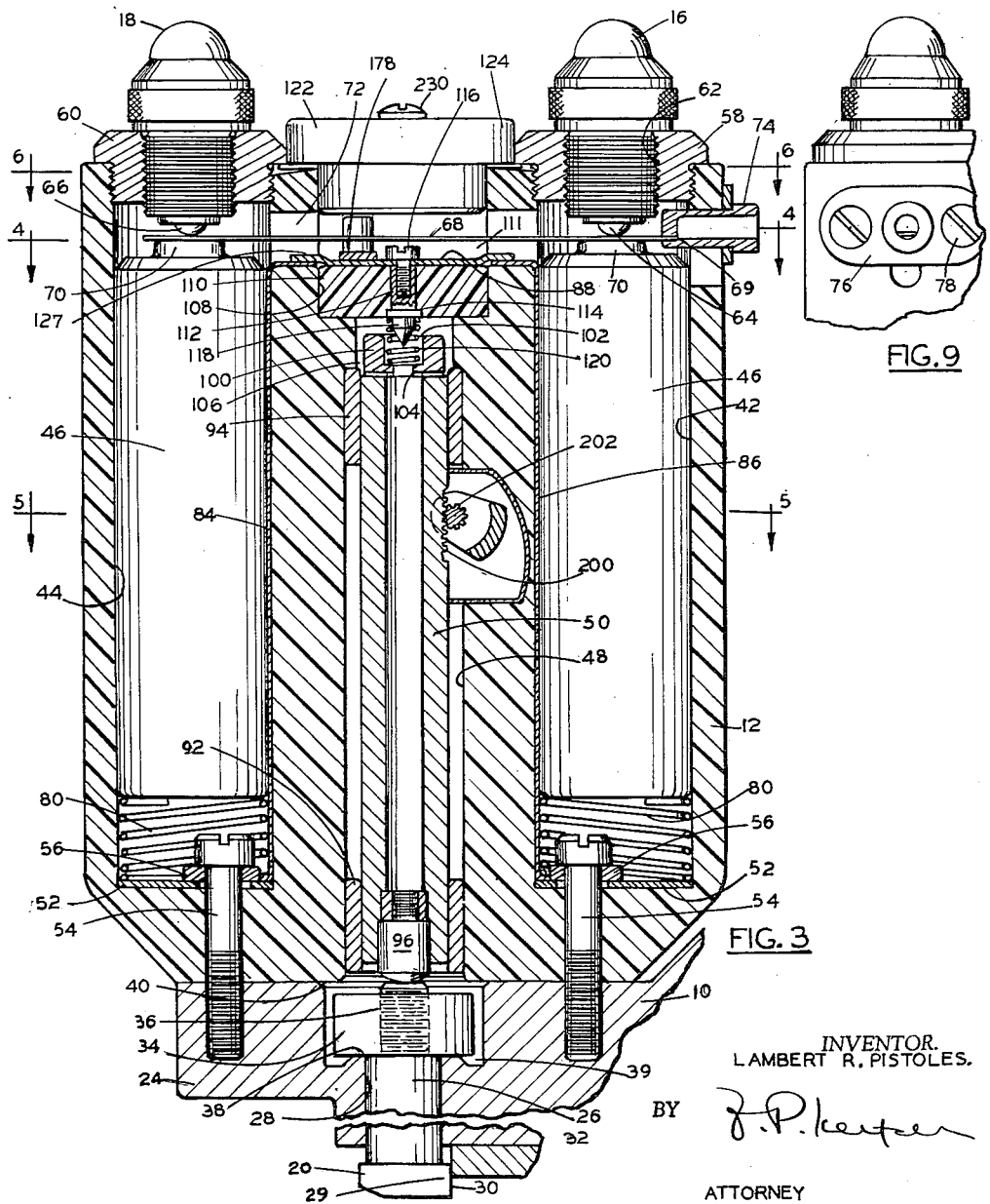
INVENTOR.
LAMBERT R. PISTOLES.
BY
ATTORNEY July 3, 1962  L. R. PISTOLES  3,042,909
GAGE HAVING BOTH DIAL AND ELECTRICAL INDICATORS
Filed Sept. 11, 1959  3 Sheets-Sheet 3

INVENTOR.
LAMBERT R PISTOLES
BY ?.P. keeper
ATTORNEY

United States Patent Office 3,042,909
Patented July 3, 1962

3,042,909
GAGE HAVING BOTH DIAL AND ELECTRICAL INDICATORS
Lambert R. Pistoles, 502 Harvey St., Philadelphia, Pa.
Filed Sept. 11, 1959, Ser. No. 839,423
9 Claims. (Cl. 340—265)

This invention relates to pin or snap type gauges, and more particularly to a gauge having both dial and electrical indicators, simultaneously actuated.

The present invention is directed to an improvement in the gauge of the type disclosed in U.S. Patent 2,783,-460, granted February 26, 1957, wherein a gauge having electrical indicators is disclosed. While such gauges having electrical flashing indicators quickly apprise an operator in respect to work pieces under inspections, the adjustment of such gauges is dependent upon application to blocks having the dimension with the plus and minus tolerances. To facilitate the adjustment of the electrical indicators and to indicate simultaneously the exact measurement, the present invention is directed to the novel combination of a dial indicator with such a gauge for simultaneous indication. Not only is the simultaneous indication of value during the actual testing operations, but is of special value in assisting in the setting of the electrical indicators, which are flashing lights in the form shown.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

Figure 6:
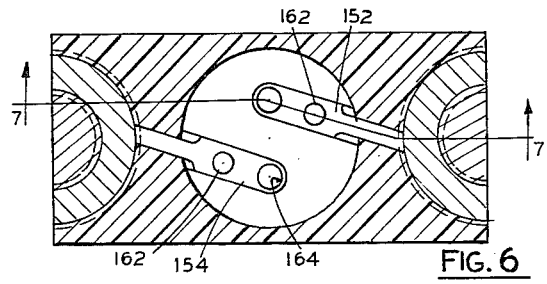
Figure 8:
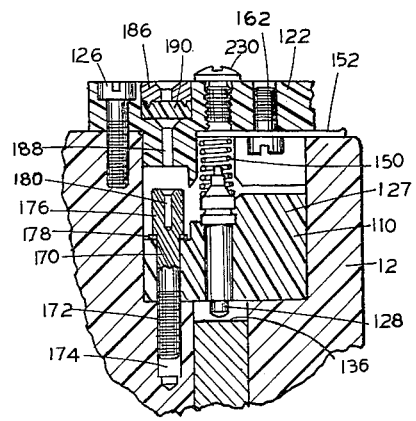
Figure 7:
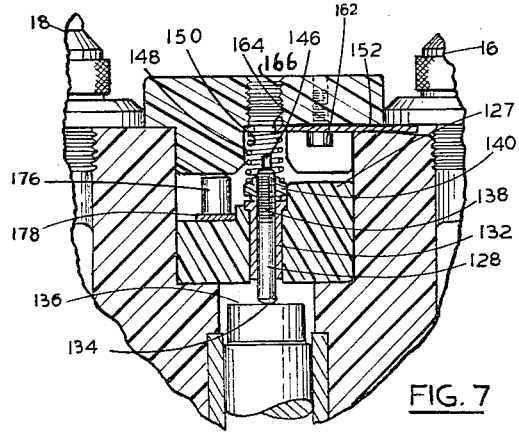

In the drawings wherein like reference characters indicate like parts:

FIGURE 1 is a front elevational view of the gauge;
FIGURE 2 is a side elevational view of the gauge;
FIGURE 3 is an enlarged sectional view taken substantially on the line 3—3 of FIGURE 2;
FIGURE 4 is a transverse section taken substantially on the line 4—4 of FIGURE 3;
FIGURE 5 is a transverse section taken substantially on the line 5—5 of FIGURE 3;
FIGURE 6 is a transverse section taken substantially on the line 6—6 of FIGURE 3;
FIGURE 7 is a sectional view taken substantially on the broken line 7—7 of FIGURE 6;
FIGURE 8 is a sectional view taken substantially on the broken line 8—8 of FIGURE 4; and
FIGURE 9 is a fragmentary side elevational view of the upper right hand side of FIGURE 1.

Referring to the drawings, and particularly FIGURES 1 and 2, there is shown a hand gauge bracket 10, on which is mounted a housing block 12, having in the front face thereof, a dial indicator 14, and having on the top side, red and green indicator lights 16 and 18, respectively. A movable gauge pin 20, projects from beneath the gauge housing, the gauge pin being located in the arm 24 of the bracket. The pin 20 is separate and independent of the mechanism contained in the gauge housing block 12. It will be understood that the gauge pin 20 co-operates with a second pin mounted on the arm 10 in a fixed manner and in axial alignment with and opposite to the pin 20. The arm 10 is provided with an adjustable stop 22, which may be set to limit the lateral application of the gauge to a work piece under test.

In FIGURE 3, the arm 24 of the bracket 10 is shown in section, and the gauge pin 20 with its shank 26, is shown as slideably mounted within the aperture 28 in the arm 24. The gauge pin head 29 is provided with a flat surface 30, which slideably engages the guide block 32 affixed to the arm 24, to prevent rotation of the pin 20. The upper end of the pin 20 is provided with an enlarged collar 34, which is threaded upon a reduced diameter portion 36 of the shank 26. The collar is adapted to limit axial movement of the gauge pin 20, the axial length of the collar being such as to limit movement by engaging the annular abutment 38 in the enlarged cavity 39, or by engaging the bottom wall 40 of the housing.

The housing 12, which may be formed of plastic, has formed therein two cylindrical chambers 42 and 44, to receive batteries 46, and a central aperture 48 in which there is provided a slideable pin 50 which is disposed in alignment with the shank 26, of the pin 20. In the bottom of the cylindrical chambers 42 and 44 are metallic discs 51 and 52, each having large apertures, through which the screws 54 extend without contact, such screws securing the housing block to the arm 24. The screws are insulated from the discs 51 and 52 by insulating washers 56. The upper end of each of the battery chambers is provided with a metallic flanged lamp receptacle, as at 58 and 60, which are screw-threaded in the upper ends of the respective battery chambers 42 and 44. The receptacles 58 and 60 are provided with red and green signal lights 16 and 18, screw-threaded, as at 62 in the respective receptacles 58 and 60, and in electrical contact therewith. Each of the lamps has central contacts, such as 64 and 66, which bear against a transverse connector strap 68, which lies across the end terminals 70, of the battery cells 46. The strap connector connects the end terminals of the batteries 46 in parallel and contacts the center contacts 64 and 66 of the lamps 16 and 18. The strap 68 extends through a transverse aperture 72, in the upper end of the housing block, and one end thereof is soldered, or otherwise secured, to a hollow outside connector bushing 74, which is affixed to a plate 76 disposed on the side wall of the block. The plate 76 is secured to the block side wall by screws 78.

The lower ends of the batteries constitute the other terminal, and connection is made thereto by coil springs 80, located in the bottom of the battery chambers 42 and 44. Each coil spring bears against the underside of the battery and its end terminal, and the respective discs 51 and 52, lying in the bottom of the chambers 42 and 44. Metallic connector straps 84 and 86 extend upwardly from the respective discs 51 and 52, along the inside walls of the apertures 42 and 44. Such straps, at their upper ends, project toward one another into the aperture 72 and are bridged over and connected together by a metallic strap 88.

The pin 50, which may be hollow for lightness, is slideably disposed within guide sleeves 92 and 94, located at opposite ends of the bore 48. The pin 50 is provided at its lower end with a hardened plug 96, which is adapted to bear against the end of the gauge pin shank 26. The upper end of the pin 50 is provided with an annular contact spacer 100, which may be formed of beryllium copper, the spacer being affixed to the end of the pin 50 by any suitable means, as for example, adhesive cement. The contact spacer 100 has a central circular recess 102, having an inwardly extending shoulder 104 at its lower end.

The bore 48 is reduced in diameter, as at 106, to provide a shoulder to locate the upper guide sleeve 94. In the upper end of the block, there is provided an enlarged cylindrical recess 108, which is in alignment with the bore 48. Disposed in the lower portion of the recess is a disc plug 110 of insulating material. The strap 88 extends diametrically across the top of the plug 110, the plug having a diametral slot 111, for the purpose. Centrally disposed in the plug 110 is a metallic bushing 112, which is flanged at its lower end as at 114. The bushing is secured in position and in electric contact with the strap 88 by the screw 116. The lower end of the bushing 112 is provided with a spring pilot 118 around which there is positioned the upper end of a coil spring 120. The lower end of the coil spring 120 is seated against the shoulder 104 of the contact spacer 100, and, the coil spring provides an electrical connection between the strap 88 and the contact spacer 100.

In the upper end of the recess is a second disc-like plug of insulating material 122, having a flange 124, the latter being adapted to seat upon the upper end of the housing block 12. The flange 124 is disposed between the receptacles 58 and 60, and is secured in place upon the end of the block 12 by one or more screws, such as 126.

The plug block 110 on either side of the diametrical groove 111, upon which the strap 88 lies, is provided with raised portions 127, in which are two spring-pressed contact members 128 and 130, each of which are slideably disposed in a bushing sleeve, such as 132, press-fitted in an aperture in the plug member 110. The pins 128 and 130 have end contact surfaces, such as 134 that are adapted to contact the annular flat top 136 of the contact spacer 100. Each of the pins 128 and 130 are threaded at their upper ends, as at 138, and provided with a square split nut 140, which yieldingly and frictionally embraces the threaded portion 138 of the respective pins 128 and 130. Each of the nuts 140 rest in squared recesses 142 and 144, to prevent rotation, but are free to slide vertically, and each of the pins 128 and 130 are provided at their upper ends with a rectangular section socket wrench receiving projection 146. The plug block 110 is held in place by screws such as 113.

In the underside of the plug member 122, there is provided a recess 148 in alignment with the axis of each of the pins 128 and 130, and in each such recess there is disposed a coil spring 150, whose lower end bears against one of the split nuts 140, the lower end being piloted thereon in an annular groove. The upper end of the springs 150 bears respectively against contact straps 152 and 154, which straps extend laterally from the said plug, the outer end of the strap 152 being clamped beneath the flange of the receptacle 58 and the outer end of the strap 154 being clamped beneath the flange of the receptacle 60. The straps are held in place by screws 162, extending upwardly, and the inner ends of each of the straps are provided with an aperture 164, of approximately the same diameter as the internal diameter of the coil spring 150. In alignment with each of the recesses 148, is a threaded aperture 166, through which a socket wrench may be inserted to engage the rectangular end 146 of each of the pins 128 and 130.

Reference has heretofore been made to the connector terminal 74, which is electrically connected to the upper terminals 70 of the batteries 46 through the strap 68. In order to provide a means of making connection to the lower terminals of the batteries 46, the lower plug 110 is provided with a contact screw 170 (see FIGURE 8), which extends through the plug 110, and is threaded as at 172 in a threaded aperture 174 in the block 12. The screw 170 has an enlarged upper end 176, which bears upon a lateral extension 178 of the strap 88, and thereby completes an electrical connection to the strap 88. The upper end of the screw 170 is provided with an axial connecting plug recess 180, adapted to receive the tapered and pointed end 182 of a contact plug 181. Access to the screw 170 for contact purposes is through a bushing 186, disposed in the upper plug 122. The bushing 186 has an aperture in alignment with an aperture 188 in the plug 122, that is also aligned with the contact recess 180 in the upper end of the screw 170. The bushing 186 is laid over a soft rubber washer 190 which seals the aperture 188 and protects the mechanism, such as the contact pins, from dust and dirt. The soft rubber washer 190, however, is readily pierced by the point 182 of the plug 181, whereby the point may be projected downwardly into the block 12, so as to make contact with the contact receptacle 189 of the contact screw 170.

The batteries 46 may be of the re-chargeable type, and charging may be effected by making connection by inserting the plug 181 to make electrical connection with the lower terminal ends of the batteries 46 and inserting the plug 194 in contact bushing 74 to make contact with the other terminals of the batteries 46. If desired, the batteries 46 may be replaced with dummies and the signal lights supplied with power from an outside source through the connecting plugs 194 and 181.

The gauge pin 50 is provided with rack teeth 200, along one side thereof which rack teeth are adapted to engage the pinion 202 of a dial indicator 14. The dial indicator has its actuating gearing 204 disposed in a recess 206 in the front face of the block 12. The bezel rim 208 surrounding the face 210 of the dial indicator may be secured in position by a plurality of radial set screws, such as 214, which project into an annular external groove 212. The dial indicator mechanism 204, which is supported upon a plate 216 is secured upon the face of the block 12, by a plurality of screws, such as 218. The actuating pinion 202 of the dial indicator mechanism 204 is adapted to mesh with the rack teeth 200 of the pin 50.

In operating the gauge, the axial length of its collar 34, in respect to the axial spacing between the annular abutment 38, and under surface 40 of the bottom wall of the housing is so chosen as to limit the movement of the pin 20 to slightly less than one complete revolution of the dial indicator pointer P. The ratio between pin movement and pointer movement may be varied by changing the diameter of pinion 202, or altering the gear ratio of the gearing 204. The dial, which is spring pressed against the bezel as by a thin annular spring 220 will hold the dial in any selected position, and the pointer may be adjusted angularly upon the shaft as at 222. Once the dial indicator is set for zero reading for the particular setting of its gage, each of the contact pins 128 and 130 are adjusted by threading the contact pins in their respective friction nuts 140, to provide a contact with the contact spacer 100, so that the pin 128, connected to the green lamp 16, will make contact when the maximum minus tolerance is reached during upward movement of the pin 50, and pin 130, connected to the red lamp 18, will make contact when the maximum plus tolerance is reached upon further upward movement of the pin 50. Thus as the gauge pin is moved upwardly during a gauging operation, the dial indicator pointer P reaches the maximum minus tolerance, at which time the green light is energized. Further upward movement of the pin moves the dial indicator past zero toward the maximum plus tolerance selected. When its dial pointer reaches the maximum plus tolerance, the red light is energized. The dial indicator thus is available to show the exact dimension of the part being gauged so that it can be determined if the dimension lies within a satisfactory tolerance range, whereas, if there be no energization of either lamp, or energization of the red lamp, the part being gauged is outside the tolerance range. Thus for rapid gauging, so long as the green light flashes, and the red light does not flash, the work piece undergoing inspection is satisfactory. Should a run of defective pieces fail to energize the green signal, or energize the red signal, reference to the dial gauge may be quickly had to observe the extent of the error.

Once the pins 128 and 130 are adjusted to their proper positions, by a socket wrench inserted through the apertures 166, 164, the wrench is removed, the apertures closed by screws 230, so that tampering of the gauge is prevented.

The pin 50 is keyed against rotation by a slot 250 and pin 252.

Although the gauge illustrated is of the "C" type, the housing block with its indicator and signal lamps may be used on a depth gauge or any gauge having a slidable pin whose movement is preferably confined to that which is equivalent to less than one rotation of the indicator pointer.

While the invention has been illustrated and described in conjunction with a single form thereof, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. An electrical gage indicator comprising a housing having a bore therein adapted to be mounted in alignment with a gaging pin, a master pin slidable in the lower portion of said bore and adapted to engage said gaging pin, a contact pin supporting block in said bore having a plurality of yieldingly mounted contact pins adapted to be sequentially engaged by said master pin, means accessible from the upper end of said bore for adjusting said pins longitudinally of said bore, an indicator lamp disposed on said housing for each contact pin, means for supplying electrical energy to said lamps through said contact pins and master pin, a dial indicator mounted in a side wall of said housing, and means including rack teeth on said master pin for simultaneous actuation of said dial indicator.

2. An electrical gage indicator comprising a housing having a bore therein adapted to be mounted in alignment with a gaging pin, a master pin slidable in the lower portion of said bore and adapted at its lower end to engage said gaging pin and having an electrical contact surface at its upper end, a contact pin supporting block in the upper portion of said bore having a plurality of yieldingly mounted contact pins extending toward said pin contact surface, and each terminating in an electrical contact surface, said contact surfaces of said pins being adapted to be sequentially engaged by direct contact with the contact surface of said master pin, means accessible from the upper end of said bore for adjusting said pins longitudinally of said bore, a dial indicator mounted in a wall of said housing, and gear means for actuating said indicator from said master pin.

3. An electrical indicating gage comprising a gage bracket having a slidable gaging pin, a housing having a bore therein mounted on said bracket with said bore in alignment with said pin, a master pin slidable in said bore and adapted to engage said gaging pin, yielding contact means disposed in said bore adapted to be sequentially contacted upon axial movement of said master pin, a dial indicator mounted in said housing having a rotating indicating pointer and means for rotating said pointer actuated by axial movement of said master pin, and means for limiting the axial movement of said gage pin to a range of movement less than that required to move said pointer through one complete revolution.

4. An electrical indicating gage comprising a gage bracket having a slidable gaging pin, a housing having a bore therein mounted on said bracket with said bore in alignment with said pin, a master pin slidable in said bore and adapted to engage said gaging pin, yielding contact means disposed in said bore adapted to be sequentially contacted upon axial movement of said master pin, a dial indicator mounted in said housing having a rotating indicating pointer and means for rotating said pointer actuated by axial movement of said master pin, means for limiting the axial movement of said gage pin to a range of movement less than that required to move said pointer through one complete revolution, and indicator lights mounted on said housing and having electrical connections to said contact means.

5. An electrical gage indicator comprising a housing having a bore therein adapted to be mounted in alignment with a gaging pin, a master pin having rack teeth along one side, and slidable in the lower portion of said bore and adapted at its lower end to engage said gaging pin and having an electrical contact surface at its upper end, a contact pin supporting block in the upper portion of said bore having a plurality of yieldingly mounted contact pins extending toward said pin contact surface, and each terminating in an electrical contact surface, said pin contact surfaces being adapted to be sequentially engaged by direct contact with the contact surface of said master pin, means accessible from the upper end of said bore for adjusting said pins longitudinally of said bore, a signal lamp mounted on said block for each of said contact pins, circuit means for each of said lamps including a source of electrical potential and said master pin, and a contact pin for each respective signal lamp, and a dial indicator mounted on said housing and having gearing engaging said rack teeth.

6. An electrical gage indicator comprising a housing having a bore therein adapted to be mounted in alignment with a gaging pin, a master pin slidable in the lower portion of said bore and adapted to engage said gaging pin, said master pin having a contact member on its upper end and insulated from the master pin, a contact pin supporting block in said bore having a plurality of slidably mounted contact pins adapted to be sequentially engaged by said master pin member, a second block in said bore above said first named block, compression springs for each of said pins bearing on the underside of said second block, a conductive coil spring disposed coaxial of the bore and between said member and first named block, an indicator lamp disposed on said housing for each contact pin, means for supplying electrical energy to said lamps through said contact pins and said member and coil spring, a dial indicator mounted in a side wall of said housing, and means including rack teeth on said master pin for simultaneous actuation of said dial indicator.

7. An electrical indicating gage comprising a gage bracket having a slidable gaging pin, a housing having a bore therein mounted on said bracket with said bore in alignment with said pin, a master pin slidable in said bore and adapted to engage said gaging pin, yielding contact means disposed in said bore adapted to be sequentially contacted upon axial movement of said master pin, a dial indicator mounted in said housing having a rotating indicating pointer and means for rotating said pointer actuated by axial movement of said master pin, means for limiting the axial movement of said gage pin to a range of movement less than that required to move said pointer through one complete revolution, indicator lights mounted on said housing and having electrical connections to said contact means, and an electric cell disposed in said housing and connected to said master pin, and said indicator lights.

8. An electrical indicating gage comprising a gage bracket having a slidable gaging pin, a housing having a bore therein mounted on said bracket with said bore in alignment with said pin, a master pin slidable in said bore and adapted to engage said gaging pin, yielding contact means disposed in said bore adapted to be sequentially contacted upon axial movement of said master pin, a dial indicator mounted in said housing having a rotating indicating pointer and means for rotating said pointer actuated by axial movement of said master pin, means for limiting the axial movement of said gage pin to a range of movement less than that required to move said pointer through one complete revolution, and indicator lights mounted on said housing and having electrical connections to said contact means, an electric cell disposed in said housing and connected to said master pin and said indicator lights, and means associated with said housing for establishing connections to said cell from an outside source of energy.

9. An electrical gage indicator comprising a housing having a bore therein adapted to be mounted in alignment with a gaging pin, a master pin having rack teeth along one side, and slidable in the lower portion of said bore and adapted at its lower end to engage a gaging pin and having an electrical contact member having a contact surface at its upper end insulated from the master pin, a contact pin supporting block in the upper portion of said bore having a plurality of yieldingly mounted contact pins extending toward said pin contact surface and insulatingly disposed in said block, and each terminating in an electrical contact surface, said pin contact surfaces being adapted to be sequentially engaged by direct contact with the contact surface of said master pin, conductive resilient means disposed coaxial of said pin and between said block and said member for urging said member away from said pin contacts, a signal lamp mounted on said block for each of said contact pins, circuit means for each of said lamps including a source of electrical potential and said member and conductive resilient means, and a contact pin for each respective signal lamp, and a dial indicator mounted on said housing and having gearing engaging said rack teeth.

References Cited in the file of this patent

UNITED STATES PATENTS

| | | |
|---|---|---|
| 1,961,764 | Horstkotte | June 5, 1934 |
| 1,968,866 | Ames | Aug. 7, 1934 |
| 2,553,397 | Ames | May 15, 1951 |
| 2,645,020 | Foster | July 14, 1953 |
| 2,677,125 | Pistoles | Apr. 27, 1954 |
| 2,783,460 | Pistoles | Feb. 26, 1957 |